Dec. 6, 1938.                    W. E. URSCHEL                    2,139,180
                                 VEGETABLE PEELER
                          Filed Sept. 12, 1936          5 Sheets-Sheet 3
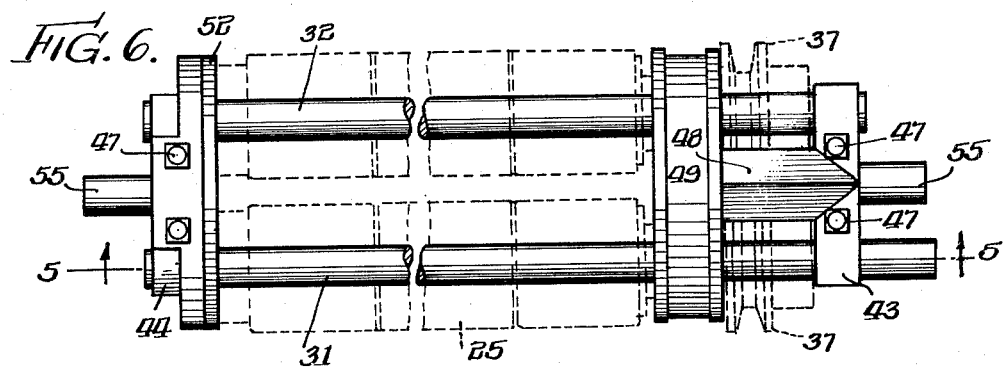
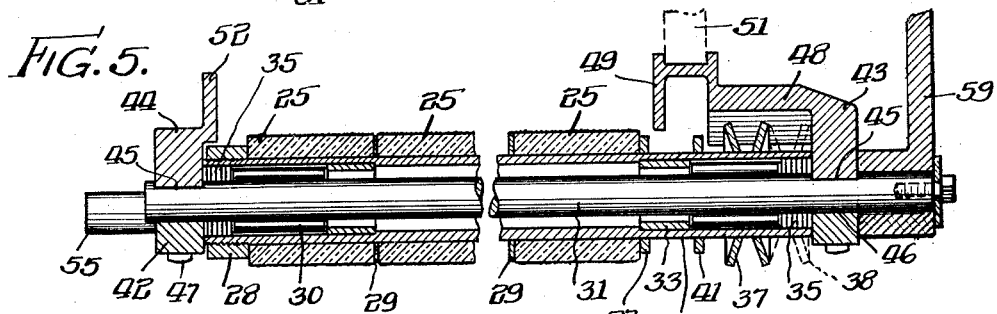
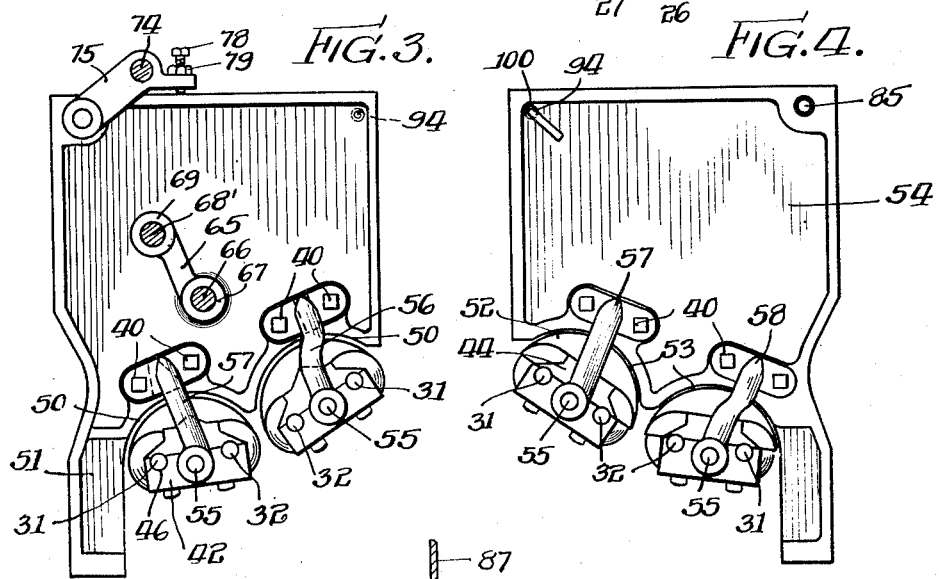
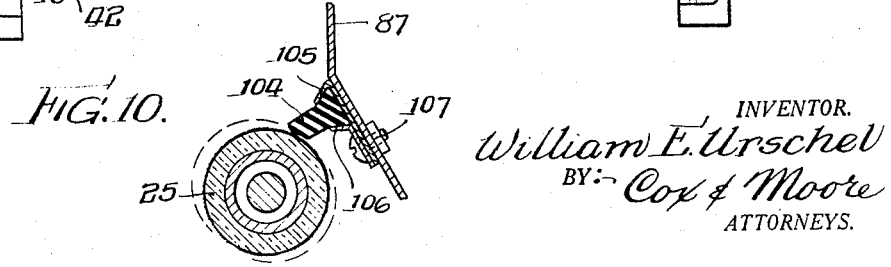
INVENTOR.
William E. Urschel
BY: Cox & Moore
ATTORNEYS.

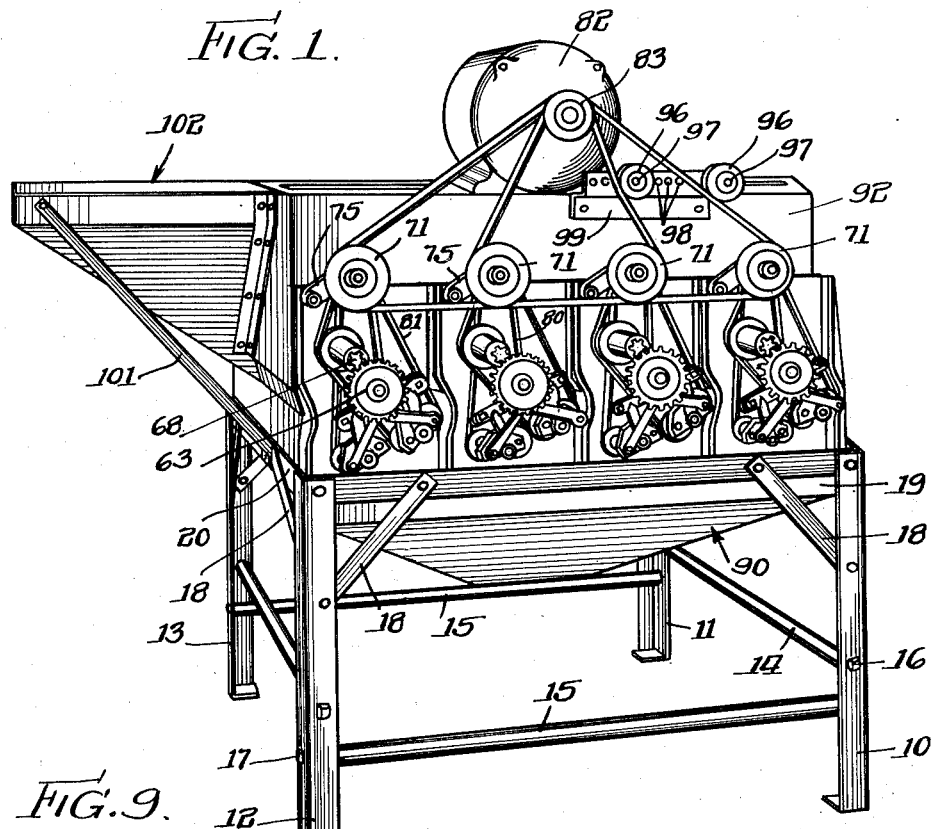
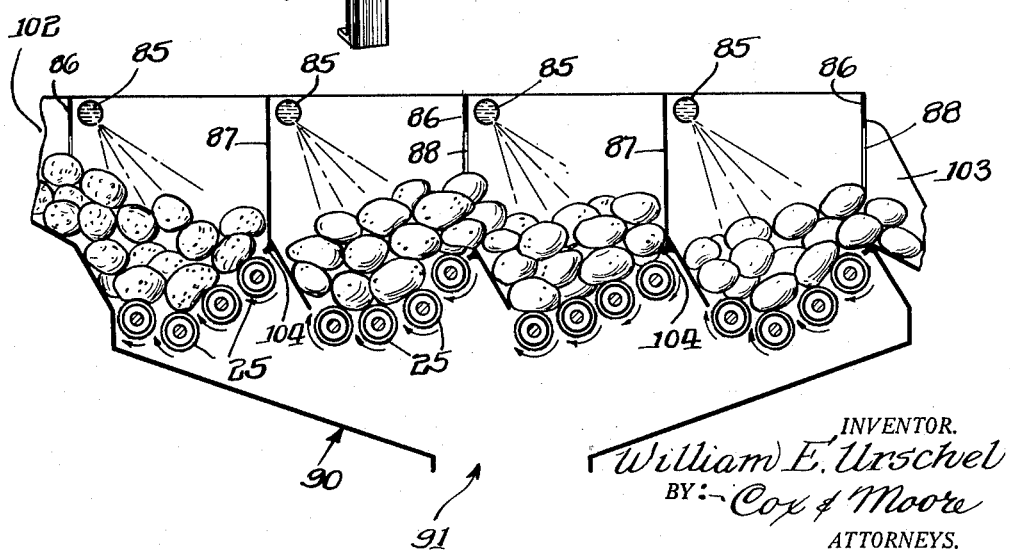

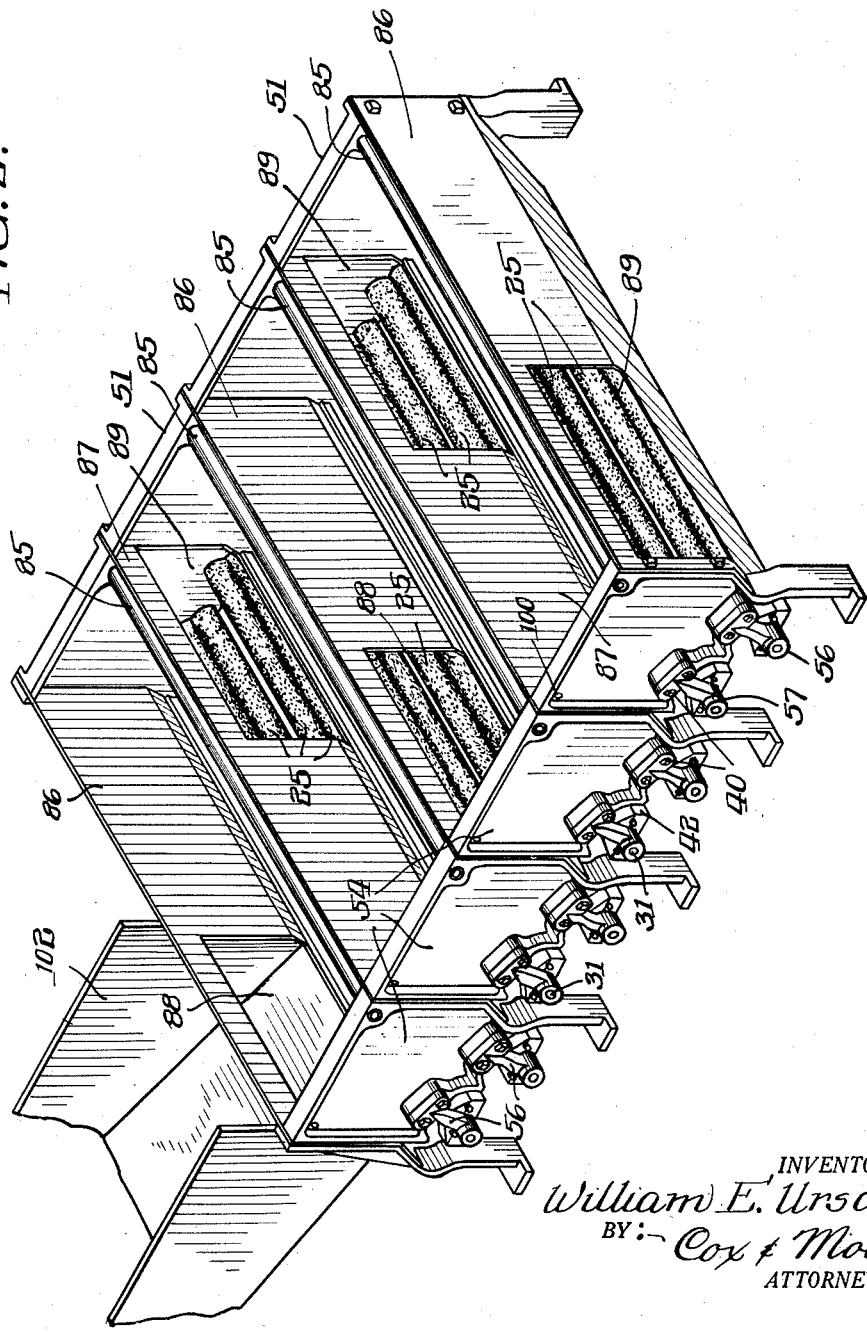

Dec. 6, 1938. W. E. URSCHEL 2,139,180
VEGETABLE PEELER
Filed Sept. 12, 1936 5 Sheets-Sheet 4

INVENTOR.
William E. Urschel
BY Cox & Moore
ATTORNEYS.

Dec. 6, 1938.  W. E. URSCHEL  2,139,180
VEGETABLE PEELER
Filed Sept. 12, 1936  5 Sheets-Sheet 5
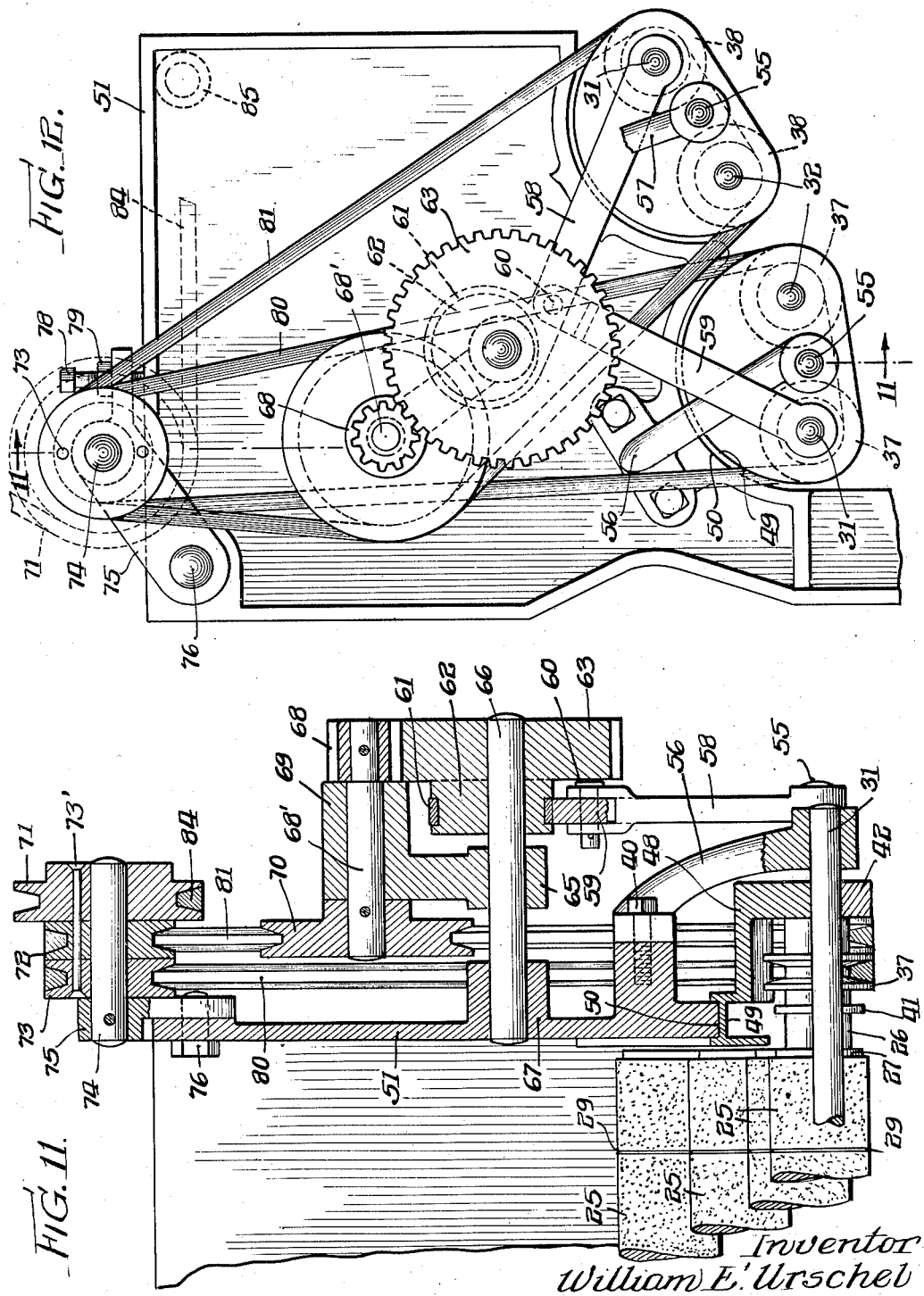
Inventor
William E. Urschel
By: Cox & Moore
attys.

Patented Dec. 6, 1938

2,139,180

UNITED STATES PATENT OFFICE 2,139,180

VEGETABLE PEELER

William E. Urschel, Valparaiso, Ind.

Application September 12, 1936, Serial No. 100,486

12 Claims. (Cl. 146—49)

This invention relates to a device for treating the surface of solid objects, and more particularly to a machine for removing the epidermis or skin of vegetables.

One of the objects of the invention is to provide a vegetable peeling machine that may be fed continuously and will discharge peeled vegetables in the same manner.

Another object of the invention is to provide a peeling machine that will discharge vegetables when their epidermis has been removed, without the assistance of an attendant or operator.

Another object of the invention is to provide means whereby a relatively finer or smoother peeling means may be used in the latter part of the peeling operation, thus resulting in a finer and more even finish on the peeled product.

Another object of the invention is to provide means whereby vegetables may be peeled with an extra smooth finish after their epidermis has been removed by the use of non-abrasive means which act upon the peeled vegetables before they are discharged from the machine.

These and other objects will be apparent from a perusal of the following specification when taken in connection with the accompanying drawings, wherein:

Fig. 1 is a general perspective view of the preferred embodiment of one form of our improved apparatus.

Fig. 2 is a perspective of the machine with supporting frame, spray guard and idler pulley assembly removed.

Fig. 3 is an elevation of the drive end casting of one of the peeling compartments with the drive mechanism removed and the shafts shown in section.

Fig. 4 is a side elevation of the end casting of a peeling compartment opposite to the one illustrated by Fig. 3.

Fig. 5 is a sectional view of one of the peeling rolls and its supports taken along line 5—5 of Fig. 6 looking in direction indicated by the arrows.

Fig. 6 is a plan view of the peeling roll supports.

Fig. 9 is a diagrammatic section taken longitudinally of the machine, illustrating the manner in which the vegetables pass through it and are peeled.

Fig. 10 is a detailed sectional view of the rubber strip and roller positioned at the lower end of the compartment walls.

Fig. 11 is a sectional elevation taken on the line 11—11 of Fig. 12.

Fig. 12 is an end elevation of one of the peeling compartments showing the drive mechanism.

Figure 7:
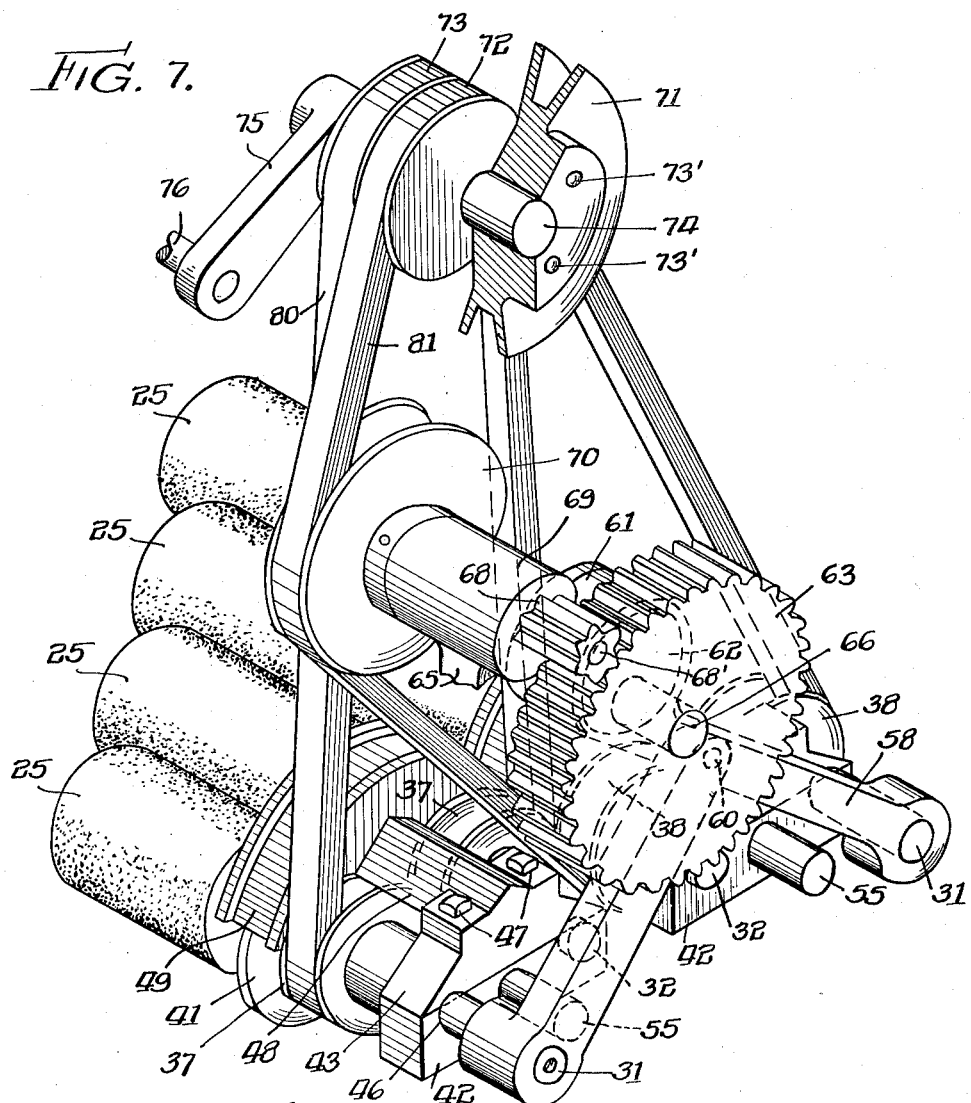
Fig. 7 is an enlarged perspective of the drive mechanism, with the walls of the peeling compartment removed.

Referring now to the drawings which illustrate a preferred embodiment constructed in accordance with my invention, the machine is supported at the forward end by two legs 10 and 11, Fig. 1, and at the rear by two legs 12 and 13. Transverse and longitudinal spacing of the legs is maintained by the tubular spacers 14 and 15 cooperating with the tie rods 16 and 17. Additional rigidity is provided by means of angularly disposed braces 18. The upper extremities of legs 10, 11, 12, and 13 are bolted to a rectangular frame made up of longitudinally and transversely disposed Z-shaped members 19 and 20 formed in such manner as to provide an inwardly extending shelf around the entire frame.

Peeling or abrasive rolls, see Fig. 5, consist of a series of rollers 25 mounted upon the sleeves 26 and secured to the sleeves for rotation therewith, and are held against longitudinal movement by means of a collar 27 welded or otherwise securely positioned on tube 26 and coacting with the nut 28 engaging the opposite threaded extremity of tube 26. Spacing washers 29 made of a resilient material are positioned at points along the axial length of each abrasive roll 25 dividing the rolls into sections and serving to make up for irregularities in the end surfaces of said rollers and also to act as a cushion. This latter function is particularly desirable when the rolls are made of abrasive-coated porcelain. Roller bearings 30 at each extremity of tubes 26 provide means for rotatably mounting tubes 26 upon rods 31 and 32, Fig. 6.

Roller bearings 30 are positioned in opposite ends of tubes 26 by means of spacing sleeves 33 and washers 35. The sleeves 33 are fitted to the inside of the tube and set against shoulders formed in opposite ends of the tubes 26. The washers 33 have an outer diameter permitting them to fit inside of the tube. The opening in the center of the washer is of the same diameter as the rods 31 and 32, which are axially arranged to support the cylinders. When the units are held in completely assembled relationship to the rest of the machine, their ends abut against the inner walls of the clamping members 42 and 46, which hold the rods 31 and 32. Thereby the washers are confined and held in position. The washers 35, which may be of cork or felt, protect bearing 30 from grit and water and also prevent the escape of bearing lubricant.

A V-grooved pulley 37 is welded in two sections to one extremity of tube 26 in the position illustrated in Figure 5. Pulleys 38 on certain of the other rollers are positioned as indicated by dotted lines in the same illustration and both sets of pulleys are driven by V-shaped belts hereinafter described. A slinger ring 41 has been provided to prevent the wash water from splashing upon V-pulleys 37 and 38.

Rods 31 and 32, see Figs. 3–5 and 7, are positioned in grooves 46 formed in the support members 42 which coact with corresponding depressions provided in the cap members 43 and 44 to provide circular apertures designed to engage the ends of the rods 31 and 32. Caps 43 and 44 are secured to supports 42 by bolts 47. Cap 43 has an extended portion 48 supporting an arcuate shaped section 49 formed to cooperate with the arcuate sections 50 of end castings 51, see Figs. 11 and 12. The arcuate portion 52 of cap 44 similarly cooperates with the arcuate portions 53 of end casting 54, see Fig. 4. Water used in washing the vegetables is thus confined within the peeling compartment.

Pivot pins 55 rigidly secured to the rod supports 42 are pivotally mounted in the hangers 56 and 57, Figs. 4–5 and 11, which are secured at their upper ends to castings 51 and 54 by means of cap-screws 48.

The abrasive roll assemblies are thus pivoted upon pivot pins 55, Figs. 7 and 11, and may be rocked thereon by means of eccentric arm 58 and link 59 pivotally mounted upon the rods 31. Link 59 is pivotally connected to eccentric arm 58 by pin 60. Eccentric strap 61 integral with link 58 is mounted upon the eccentric hub 62 formed upon spur gear 63. Spur gear 63 is rotatably mounted upon pin 66 rigidly secured in the extending stud support 67 of casting 51, Figs. 3 and 11. Pinion 68 is integrally secured by a pin to inwardly extending shaft 68' journaled in bearing 69. The bearing member 69 is in turn fixedly secured to arm 65 of stud support 66. A V-grooved pulley 70 is pinned to the other extremity of the shaft 68'.

V pulleys 71, 72 and 73 are riveted together by means of rivets 73', and are rotatably mounted upon shaft 74. Shaft 74 is pinned at one extremity in place in an aperture formed in arm 75, Fig. 12, pivotally mounted upon pin 76 which is in turn rigidly secured in the frame. Cap-screw 78 which is threaded into engagement with a projection on the arm 75 and lock-nut 79 serve to control the position of arm 75 by forcing the end of the cap-screw against the top of casting 51. Thus means is provided to control tension in belts 80 and 81 driven by pulleys 72 and 73. Belts 80 and 81 enable pulleys 72 and 73 to drive pulleys 37, 38, and 70, thereby rotating the abrasive peeling rolls and causing eccentric 62 to rock the peeling roll assembly by means of eccentric arm 58 and link 59.

A motor 82, Fig. 1, provides the energy to operate the machine and drives pulleys 71 by means of belts 84 and pulley 83. Idler pulleys 96 rotatably mounted upon studs 97 serve to adjust the tension in belts 84. Adjustment is provided by positioning studs 97 in the circular apertures 98 in Z-bar member 99 bolted to the superstructure or spray retainer 92.

Figure 8:
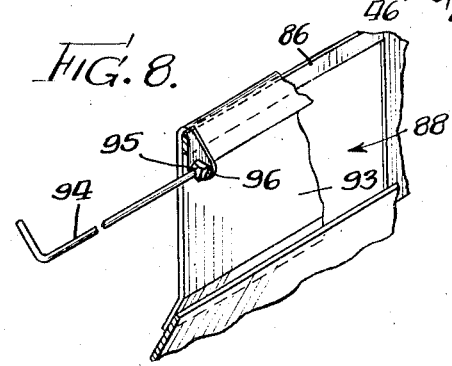
Fig. 8 is a perspective of the sliding gates for partition openings with a portion broken away.

A preferred embodiment of the machine as illustrated in Figs. 1 and 2, has four identical units. End castings 51 and 54 are held in fixed relation by partition wall members 86 and 87, Fig. 2. Openings 88 and 89 have been provided in partitions 86 and 87, respectively, to permit vegetables to pass from one peeling unit to the one adjacent to it. To control the rate of speed at which the vegetables move through each compartment, sliding gates 93, Fig. 8, are used. Gates 93 slide along the upper edges of partitions 86 and 87, and are controlled by rods 94 secured to ear 95, and extending through circular apertures 100 in castings 51. This arrangement permits gates 93 to be operated from a readily accessible position.

A spray pipe 85 permits water to be directed upon the vegetables as they are being peeled and provides means for a thorough cleansing and flushing off of the peelings and débris.

The water, after having passed downwardly through the vegetables, is caught by the drain pan 90, Fig. 1, bolted to frame members 19 and 20. The sloping surfaces of the drain pan direct the water to an opening at 91 through which the water escapes from the machine.

To prevent stones or other hard substances from crushing or otherwise injuring the abrasive rolls 25, in the event they become lodged between the last roll 25 and partitions 86 or 87, a rubber strip 104 has been positioned as shown in Figs. 9 and 10. The strip 104 is provided with a flaring, wedge-shaped base which is engaged by the inwardly bent edges of the metal strips 105 and 106. Apertures are provided at spaced points along the strips and there are corresponding apertures in the partition 87. Machine screws pass through these openings and are secured in place by nuts. Thus the rubber strip is clamped in position with respect to the roll 25. The resilient action of the rubber strip allows the hard substances to pass by and then springs back to its original position to prevent small vegetables from passing downwardly between the last roll 25 and partition 86 or 87.

A substantially rectangular superstructure or spray guard 92, Fig. 1, bolted to end castings 51 and 54 and the partition members 86 and 87, has been provided to retain the spray that rises above the peeling compartments when the machine is in operation.

A feed hopper 102, Fig. 1, bolted or riveted to partition 86 and spray guard 92 facilitates the feeding of vegetables into the machine. Brace 101 provides additional rigidity for the feed hopper.

A conventional discharge chute 103, Fig. 9, directs the peeled vegetables upon a conveyor or into a suitable receptacle.

In operation, motor 82, Fig. 1, by means of pulley 83 and belts 84, drives the intermediate pulleys 71. Pulley 72, Fig. 7, integral with pulley 71, drives pulleys 37 and 38 upon the abrasive roll supporting tubes 26, through belts 80 and 81. Thus the peeling rolls are all driven continuously in the direction shown in Fig. 9. Belt 81 also drives the pinion 68 through pulleys 70 and shaft 68'. Pinion gear 68 drives spur gear 63 provided with the eccentric hub 62. Eccentric hub 63 thereupon actuates arm 58 and link 59, pivotally connected to rods 31, thereby causing the peeling roll support assembly and the pivot pins 55 to rock in the hangers 56 and 57 secured to the end castings 51 and 54.

The vegetables are placed in the feed hopper 102, Fig. 1, and being aided by its sloping surfaces flow or roll into opening 88, Figs. 2 and 9. The vegetables then come in contact with rolls 25 and are carried forwardly and upwardly until they come in contact with partition member 87, Fig. 9. The rocking motion transmitted to each set of rolls 25 by the action of eccentric 69, arm 58, and link 59, imparts a rolling motion to the vegetables as they travel over the abrasive rolls 25. This rolling motion tends to expose all portions of the vegetable epidermis to the abrasive surface of rolls 25. The rolling of the vegetables also causes them to bounce upwardly and backwardly upon contact with partition 87. This causes the whole mass of vegetables to roll in an anti-clockwise direction in Fig. 9. Vegetables bouncing or rebounding from partition 87 will roll toward the lowest point possible and also toward the end of the compartment having the opening 89 since that portion of the bin or compartment will be initially empty or will be discharging through the opening 89. Reaching the base, the pile of vegetables will again come in contact with rolls 25 and the entire process again repeated, with the first vegetables approaching closer to opening 89 each time the vegetable mass makes a revolution. Since the vegetables entering the machine are constantly displacing the vegetables that have entered before them, there will be a constant anti-clockwise helical motion (Fig. 9) of the vegetable mass approaching opening 89. Vegetables reaching opening 89 are rolled into the next compartment and the process is repeated, the rolling or flowing through the machine being repeated in the successive chambers until the vegetables are discharged by the chute 103.

Gates 93, sliding along the upper edges of compartment members 86 and 87 enable the size of openings 88 and 89 to be varied, thereby providing means to regulate the length of time the vegetables occupy each compartment. By merely narrowing the width of the openings between the compartments, by means of the gates 95, the length of time required for the articles to pass through the machine may be increased as desired. This control is an important feature since various vegetables, and even various conditions of the vegetable themselves, require different periods of contact with the abrasive rolls to remove the epidermis satisfactorily.

The grade or size of abrasive on the peeling rolls may be varied. That is, a coarse, fast cutting abrasive may be used in the first and second compartments, while a finer or slower cutting abrasive may be used in the last two compartments. Moreover, any equivalent cutting or peeling rolls may be employed.

The abrasive rolls 25 have been described as abrasive coated porcelain, but other materials may be used. Rubber rolls may be substituted for abrasive rolls 25 in the last compartment to impart a smooth finish on the vegetables before they are discharged from the machine.

The continuous feeding and discharge feature of the machine makes it adaptable for use with conveyors for both feeding and removing peeled vegetables from the machine. Other types of peelers which require intermittent feeding, and consequently intermittent discharges, necessitate interrupted feed conveyor travel. It will be obvious that the instant machine will not only peel vegetables but will surface and remove epidermis coatings of any equivalent fruits or other materials.

It will be obvious that changes may be made in the form, construction and arrangement of the parts and the method of operation may be varied to some degree without departing from the spirit of the invention or sacrificing any of its advantages and the right is hereby reserved to make all changes which fairly fall within the scope of the following claims.

Having thus described the invention, what is claimed as new and desired to be secured by Letters Patent, is as follows:

1. In a vegetable peeling mechanism having a series of abrasive rolls therein, upon which the vegetables are peeled in seriatim order, the improvement which comprises providing initially relatively roughened rolls for carrying out the rough peeling, and final peeling rolls disposed adjacent the discharge point and being provided with relatively fine abrasive.

2. In a vegetable peeling device of the class described, a plurality of inclined beds of substantially parallel peeling rollers, each roller rotating toward the upper end of its respective incline, a casing for each bed of rollers having walls adjacent the lower and upper ends of the incline, feed and discharge openings in said walls, each bed being arranged in series with respect to the other beds with the discharge of one bed feeding continuously into the adjacent bed, and means to continuously introduce material to be peeled into the feed opening of the first bed.

3. In a vegetable peeling device of the class described, a plurality of inclined beds of substantially parallel peeling rollers, each roller rotating toward the upper end of its respective incline, a casing for each bed of rollers having walls adjacent the lower and upper ends of the incline, feed and discharge openings in said walls, each bed being arranged in series with respect to the other beds with the discharge of one bed feeding continuously into the adjacent bed, means to continuously introduce material to be peeled into the feed opening of the first bed, and means to bodily displace rollers to produce a turbulence of the vegetables supported thereby to cause all sides thereof to come in contact with the peeling rollers.

4. In a vegetable peeling device of the class described, a plurality of inclined beds of peeling rollers, each roller rotating toward the upper end of its respective incline whereby to convey the vegetables in contact with the rollers in said direction, partitions adjacent the upper and lower ends of the incline and on the sides thereof to enclose the said beds, and apertures in the upper and lower partitions for continuously feeding and discharging vegetables on said beds under the influence of said conveying action, one said aperture being situated toward one side of each bed and the discharge opening toward the other side whereby to produce a movement of the vegetables generally transverse to the said direction of rotation of the rollers, the plurality of beds being arranged in series so that the vegetables discharged from one bed are continuously fed to the next succeeding bed.

5. In a vegetable peeling device of the class described, a plurality of inclined beds of peeling rollers, each roller rotating toward the upper end of its respective incline whereby to convey the vegetables in contact with the rollers in said direction, partitions adjacent the upper and lower ends of the incline and on the sides thereof to enclose the said beds, apertures in the upper and lower partitions for continuously feeding and discharging vegetables on said beds under the influence of said conveying action, the said apertures being situated adjacent opposite sides whereby to produce a movement of the vegetables generally transverse to the said direction of rotation of the rollers, the plurality of beds being arranged in series so that the vegetables discharged from one bed are continuously fed to the next succeeding bed, and adjustable gates on said apertures to control the passage of vegetables therethrough.

6. A continuous vegetable peeling mechanism comprising a bed having a plurality of generally parallel, longitudinally extending peeling rollers, means to rotate substantially all of said rollers in the same direction whereby to direct the vegetables on the bed in said direction, means to continuously feed a mass of vegetables to the bed, walls arranged adjacent the sides of the bed extending generally parallel to the axes of the rollers and adapted to change the direction of travel of the said rearwardly directed vegetables whereby to produce a generally rotational movement of the mass of vegetables therein, and means to discharge vegetables from the said bed, said feeding means being arranged toward one end of the said rollers and the discharge means adjacent the opposite end of the rollers said feed means and said discharge means opening into the bed in offset relationship with respect to the direction of rotation of the rollers to produce a generally spiral movement of the vegetables while continuously passing across the bed.

7. A plurality of devices such as defined in claim 6, arranged so that the material discharged from one bed is continuously directed to feed the next succeeding bed.

8. A vegetable peeling mechanism for continuous operation comprising a bed having a plurality of parallel, horizontal peeling rollers, said peeling rollers having cutting means thereon to engage the skin of a vegetable and remove it bodily therefrom, means to rotate substantially all of the rollers in the same direction, upstanding, axially extending front and rear walls at either side of the bed of peeling rollers adapted to change the direction of movement of material on the rollers, and a feed and discharge opening in said front and rear walls respectively, said openings occupying a portion only of the area of said walls and being offset with respect to the direction of rotation of the rollers.

9. In a vegetable peeling mechanism, a series of peeling units, each unit comprising an inclined bed of abrasive peeling cylinders, each cylinder having thereon abrasive means adapted to engage the epidermis of a vegetable and separate it bodily therefrom when the cylinder is moved relatively to the vegetable, means to rotate substantially all the cylinders in the said direction of upward inclination, and means to bodily move at least one of the cylinders to change the level of the bed, the cylinders being so arranged as to progressively engage and convey material up the inclined beds as peeling progresses in a path generally transverse to the axes of the rollers and to a discharge station at the top of the inclined beds, the lower end of each successive bed being substantially below the upper end of the preceding bed whereby the material is successively caused to fall from the discharge side of one bed to the feed side of the succeeding bed.

10. In a continuous vegetable peeling device of the class described comprising a series of units, each unit comprising a plurality of parallel peeling rollers forming a bed, said peeling rollers having means on the surface for attachment to the epidermis of a vegetable when placed in contact therewith and for removing the epidermis bodily therefrom when the cylinder is moved relative to the vegetable, means to displace the axes of the rollers to produce turbulence, means to rotate substantially all the rollers toward the rear of the machine, said rollers being operatively arranged to progressively convey the material to be peeled toward the rear of the machine, an upstanding abutment wall at the rear of the machine to change the direction of movement of the material conveyed thereto, and a discharge opening occupying a portion only of the area of said wall, a plurality of said units being arranged in seriatim order with the discharge openings of certain of the units discharging directly into the succeeding units and successive discharge openings being offset with respect to the direction of rotation of the rollers.

11. In a vegetable peeling mechanism having a bed comprising a series of parallel, abrasive peeling cylinders, said peeling cylinders having means thereon for attachment to the epidermis of a vegetable or the like for bodily separating the epidermis from the vegetable when the cylinders are moved relative thereto, a feed side and a discharge side for the bed, means to rotate all of the cylinders in the bed toward the discharge side to convey the material from the feed side to the discharge side in a direction generally transverse to the axes of the cylinders, and surfacing cylinders in combination with said abrasive cylinders and being adapted to provide a relatively smooth surface on the peeled material, said surfacing cylinders forming a part of the bed and being substantially parallel to the abrasive cylinders and arranged between the abrasive cylinders and the discharge side, said surfacing cylinders having rubber surfaces.

12. In a fruit and vegetable peeling device of the class described, a plurality of beds of substantially parallel peeling rollers, each peeling roller having adjacent the surface thereof means for engaging the epidermis of a fruit or vegetable and removing it bodily therefrom when the cylinder is moved relative to the vegetable, means to rotate each roller toward one axially extending side of the bed, a casing for the bed of rollers having walls adjacent the said axial sides of the bed, feed and discharge openings in said side walls, the discharge opening being offset from the feed opening in a direction substantially parallel with the axes of the rollers, and means to continuously introduce material to be peeled into the feed opening for continuously withdrawing material from said discharge opening.

WILLIAM E. URSCHEL.